Feb. 13, 1934.  G. LAUGHLIN  1,946,629
COLLET CHUCK
Filed Jan. 16, 1933
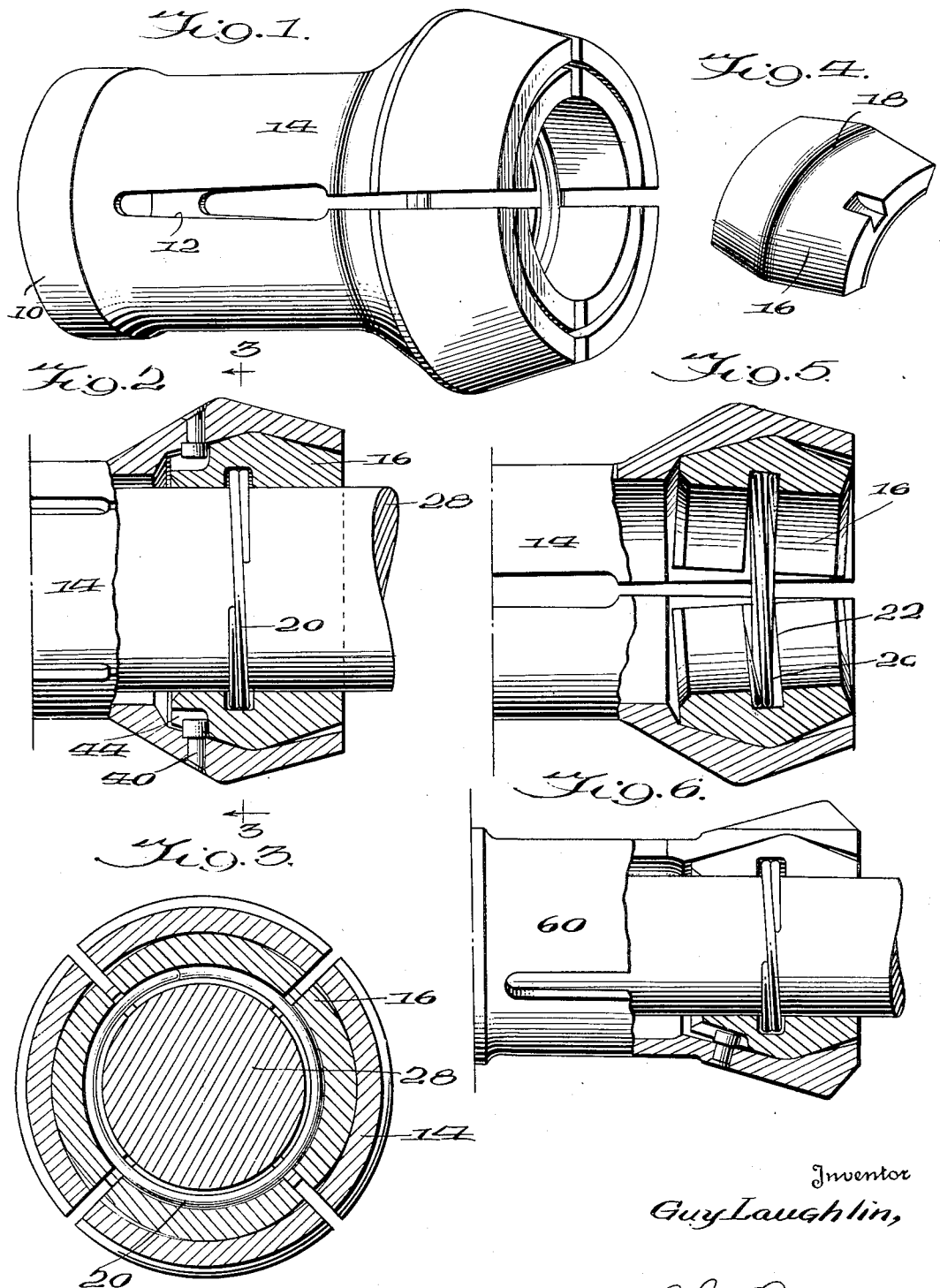
Inventor
Guy Laughlin, Patented Feb. 13, 1934

1,946,629

UNITED STATES PATENT OFFICE 1,946,629

COLLET CHUCK

Guy Laughlin, Birmingham, Mich.

Application January 16, 1933. Serial No. 652,072

14 Claims. (Cl. 279—51)

This invention relates to collet chucks especially adapted for use in bar forming machines, automatic and hand operated screw machines, and other machines in which bars of stock or other work are held in position by the collet chuck while being operated on by suitable tools.

More particularly, the invention has reference to collet chucks or holding collets of the type in which detachable work engaging jaws or pads are employed and in this case there will be found special means allowing the pads to adapt themselves to the bar of stock or other work being handled to compensate for irregularities or inequalities in the work.

Another feature of the invention will be found to reside in the means by which the various pads are normally held in slightly converging relation toward each other to define a gradually restricted passage for a bar of stock or the like to the end that the insertion of the bar of stock through the collet is facilitated.

Another feature of the invention is to provide a collet of the type described which is cheap to manufacture, and which is of rugged and highly simplified construction.

Other objects and advantages will be apparent during the course of the following description.

In the accompanying drawing, forming a part of this application, and in which like numerals are employed to designate like parts throughout the same, Figure 1 is a perspective of the improved collet, Figure 2 is a detail longitudinal sectional view through one end portion of the collet with a bar of stock in place, Figure 3 is a detail transverse sectional view taken on line 3—3 of Figure 2, Figure 4 is a perspective of a pad embodied in the invention, Figure 5 is a detail longitudinal sectional view through the forward portion of the collet, the view illustrating the means by which the pads are caused to converge slightly for the insertion of a bar of stock, Figure 6 is a side elevation illustrating a collet of the draw or pull type embodying the invention.

In the drawing, the numeral 10 generally designates a tubular body which may, of course, be formed in any one of a number of well-known manners, for example, from a casting, tubing, pressed metal, but usually from solid bar stock or forging.

As shown in Figure 1, the body 10 is provided with a plurality of longitudinal circumferentially spaced slots 12 opening out through the forward end of the collet and terminating short of the rear end thereof to define an annular series of transversely curved fingers 14.

With particular reference to Figure 2 it will be seen that the forward portion of the body 10 is enlarged diametrically both internally and externally to define a chamber for the reception of a filler embodying an annular series of arcuate pads 16. More specifically, the filler gripping portions of the fingers 14 are angled outward between the ends thereof and the outer surfaces of the arcuate pads 16 are also angled outward on substantially straight lines to produce circumferential ribs 18 normally seated in the bottom portions of what might be said to be the V-shaped groove defined by angling the forward portion of the body.

The ribs 18 produced by increasing the external diameter of the filler toward a point between the ends of the filler allows the pads 16 to rock and in this connection attention is invited to Figure 5 in which it is illustrated that an expansion helical spring 20 is seated in an annular groove 22 in the inside surfaces of the pads at a point rearward of the external ribs 18 urging the rear external faces of the pads 16 to bear flatly against the opposed surfaces of the fingers or leaves 14 with the result that the jaws normally converge toward their forward ends and thereby form a gradually restricted passage for the insertion of a bar of stock 28.

When the collet is closed to its working position with the pads in engagement with a bar of stock, the pads will start gripping at the front end of the collet and will, by the inherent resiliency of the fingers 14, be urged into uniform pressure contact with the work, notwithstanding inequalities therein.

However, when a bar of stock has been passed through the collet as suggested in Figure 2, the pads 16 will occupy positions in which the bar contacting surfaces thereof are parallel to the axis of the collet or substantially so.

Now, with reference to Figure 3 it will be seen that in addition to being rockable about axes at right angles to the axis of the collet, the pads 16 may also rock about axes extending parallel to the longitudinal axis of the collet, allowing the individual pads to adapt themselves to the bar of stock even though the bar of stock may have slight inequalities therein, such as being out of round.

In other words, the outside surfaces of the pads recede from the walls of the fingers 14 toward the ends and longitudinal edge portions of the pads allowing the pads to rock transversely and longitudinally as well as individually to the end that such pads are permitted to adapt themselves to the particular configuration of the work of whatever nature the latter happens to be.

In Figure 2 it is shown that approximately radial pins 40 are carried by the fingers 14 and fit more or less loosely into mating sockets or recess 44 in the outer surfaces of the pads so as to hold the pads against circumferential shifting and thereby maintain the longitudinal edges of the pads more or less in line with the longitudinal edges of the fingers 14. The pins receiving sockets 40 are shown to open out through the rear ends of the pads so that it is a simple matter to insert the pads or remove the same.

In carrying out the invention the body 10 of the collet may be formed with any desired number of segmental fingers 14 and with a corresponding number of pads, it being clear, of course, that the mounting of the pads provides for the expeditious removal and renewal of the pads when necessary or desirable.

With further reference to the mounting of the pads to provide for the expeditious removal and installation of the pads, it is pointed out that the pin and slot connection between the pads and the surrounding fingers is located adjacent the rear ends of the pads and that the slots actually open out through the rear ends of the pads so as to allow the slots 40 to receive the pins during the endwise introduction of the pads into the tubular body. Also, the arrangement and location of the pin and slot connection between the pads and the tubular body provides a simple means by which substantially endwise withdrawal of the pads will interrupt the pin and slot connection, without substantial separation of the spring fingers 14.

In addition, while the pin and slot connection between the pads and the surrounding fingers provides for the substantially endwise withdrawal and introduction of the pads through the stock outlet end of the tubular body without extensive spreading of the fingers, such arrangement also allows of the full operation of the rockable connection between the pads and the fingers. That is to say, the length of each slot 44 is sufficiently greater than the diameter of that portion of the pin received in the slot to allow of the rocking of the pads within the full limits allowed by the angles of the opposed faces of the pads and fingers.

The collet shown in Figures 1 to 5 inclusive will be recognized as of the push type while the collet 60 shown in Figure 6 and embodying all the features of the collet shown in Figures 1 to 5, will be recognized as being of the pull or draw type.

Having thus described the invention what is claimed is:—

1. In a collet, a tubular body having a series of transversely curved spring fingers, provided with bearing surfaces inclined outward toward the meeting portions thereof and disposed at acute angles to the longitudinal axis of the body, and pads having outside bearing surfaces inclined outward toward the intermediate portions of the pads and bearing against said first named bearing surfaces, the bearing surfaces of said pads being at more acute angles to the longitudinal axis of the body than the angles of said first named bearing surfaces allowing the pads to rock about axes approximately at right angles to the longitudinal axis of the body, the external circumferential curvature of said pads being in arcs less than that of the bearing surfaces of said fingers, allowing the pads to rock about axes extending substantially parallel to the longitudinal axis of the body.

2. In a collet, a tubular body having a series of spring fingers provided with bearing surfaces inclined outward toward the meeting portions thereof and disposed at acute angles to the longitudinal axis of the body, pads having outside bearing surfaces inclined outward toward the intermediate portions of the pads and bearing against said first named bearing surfaces, the bearing surfaces of said pads being at more acute angles to the longitudinal axis of the body than the angles of said first named bearing surfaces allowing the pads to rock about axes approximately at right angles to the longitudinal axis of the body, and an expansion spring urging said pads outward at points removed from the center lines of said pads thereby causing the pads to converge.

3. In a collet, a tubular body having a plurality of spring fingers, pads having circumferential ribs rockably engaged with said fingers, and expansion spring means urging said pads outward at points spaced longitudinally from said ribs thereby urging the pads to occupy converging positions with respect to each other.

4. In a collet, a tubular body having a plurality of spring fingers provided with angularly directed bearing surfaces, pads having raised portions engaging said bearing surfaces adjacent the meeting portions thereof, thereby allowing the pads to rock, and an expansion spring urging said pads outward at points between the center and rear ends thereof thereby urging the forward portions of the pads to converge.

5. In a collet, a tubular body having a plurality of spring fingers provided with angularly directed bearing surfaces, pads having raised portions engaging said bearing surfaces adjacent the meeting portions thereof, thereby allowing the pads to rock, and an expansion spring urging said pads outward at points between the center and rear ends thereof thereby urging the forward portions of the pads to converge, the inner surfaces of said pads being formed with a groove receiving said spring.

6. In a collet, a tubular body having a series of spring fingers provided with bearing surfaces inclined outward toward the meeting portions thereof and disposed at acute angles to the longitudinal axis of the body, and pads having outside bearing surfaces inclined outward toward the intermediate portions of the pads and bearing against said first named bearing surfaces, the bearing surfaces of said pads being at more acute angles to the longitudinal axis of the body than the angles of said first named bearing surfaces allowing the pads to rock about axes approximately at right angles to the longitudinal axis of the body.

7. In a device for engaging stock in a metal working machine, a body having a plurality of spring fingers, pads surrounded by said fingers and having recesses, and pins carried by said fingers and extending into said recesses, said recesses being extended out through the rear ends of the pads allowing the pins to be introduced into the recesses through the rear ends of the pads.

8. In a collet, a tubular body having a plurality of spring fingers, pads surrounded by said fingers and detachably associated therewith, said pads being formed with recesses in the outer sides thereof, and pins rigidly carried by said fingers and having portions freely received in said recesses, said recesses being opened out through the ends of the pads.

9. In a collet, a tubular body having stock inlet and outlet ends and provided with a plurality of fingers, pads surrounded by said fingers and having stock engaging surfaces, there being a rockable engagement between the pads and the surrounding fingers for movement of the said stock engaging surfaces of the pads into diverging relation toward the stock inlet end of the tubular body, and means spaced longitudinally beyond the rockable engagement of the pads with the fingers for urging the stock engaging surfaces of the pads into diverging relation in the direction of the stock inlet end of the tubular body.

10. In a collet, a tubular body having stock inlet and outlet ends and provided with a plurality of fingers, pads surrounded by said fingers and having stock engaging surfaces, there being a rockable engagement between the pads and the surrounding fingers for movement of the stock engaging surfaces of the pads into diverging relation toward the stock inlet end of the tubular body, and means located to urge the stock engaging surfaces of the pads into diverging relation in the direction of the stock inlet end of the tubular body.

11. In a collet, a tubular body having a plurality of spring fingers, and individual removable pads surrounded by said fingers, there being a pin and slot connection between said pads and said fingers adjacent the inner ends of the pads, said slot having an open end directed toward one end of the tubular body for the passage of the pin during removal and installation of the pads.

12. In a collet of the type described, a tubular body having inlet and outlet ends for the passage of stock, and individual removable separate pads surrounded by said tubular body and movable through said stock outlet end of the body during installation and removal of the pads, there being a pin and slot connection between said pads and said tubular body adjacent the inner ends of the pads, said slot having an open end directed toward one end of the body for the passage of the pin during removal and installation of the said individual pads through said stock outlet end.

13. In a collet, a tubular body having stock inlet and outlet ends and provided with a plurality of fingers, individual removable pads surrounded by said fingers and having stock engaging surfaces, there being a rockable connection between the pads and the surrounding fingers for movement of the stock engaging surfaces of the pads into diverging relation toward the stock inlet end of the tubular body, and means located to urge the stock engaging surfaces of the pads into diverging relation in the direction of the stock inlet end of the tubular body, there being a pin and slot connection between said pads and said tubular body adjacent the inner ends of the pads, said slot having an open end directed toward one end of the body for the passage of the pin during removal and installation of the individual pads through said stock outlet end.

14. In a collet, a tubular body having stock inlet and outlet ends and provided with a plurality of fingers, individual removable pads surrounded by said fingers and having stock engaging surfaces, there being a rockable connection between the pads and the surrounding fingers for movement of the stock engaging surfaces of the pads into diverging relation toward the stock inlet end of the tubular body, and means located to urge the stock engaging surfaces of the pads into diverging relation in the direction of the stock inlet end of the tubular body, there being a pin and slot connection between said pads and said tubular body, said slot having an open end directed toward one end of the body for the passage of the pin during removal and installation of the individual pads through said stock inlet end.

GUY LAUGHLIN.